United States Patent [19]
Jaskowiak et al.

[11] Patent Number: 5,555,184
[45] Date of Patent: Sep. 10, 1996

[54] DEVELOPER ROLLER ASSEMBLY AND METHOD FOR MAKING SAME

[75] Inventors: Timothy R. Jaskowiak; Steven C. Hart, both of Webster, N.Y.

[73] Assignee: Xerox Corporation, Stamford, Conn.

[21] Appl. No.: 297,281

[22] Filed: Aug. 29, 1994

[51] Int. Cl.⁶ .................................................. G03G 15/08
[52] U.S. Cl. ............................ 355/259; 355/251; 492/30
[58] Field of Search ................................... 355/259, 251, 355/253, 245; 118/656–658; 492/18, 28, 30–37; 428/36.9

[56] References Cited

U.S. PATENT DOCUMENTS

| | | | |
|---|---|---|---|
| 4,034,709 | 7/1977 | Fraser et al. | 118/658 |
| 4,267,797 | 5/1981 | Huggins | 118/658 |
| 4,449,810 | 5/1984 | Ikesue et al. | 355/245 |
| 4,558,943 | 12/1985 | Patz . | |
| 4,700,659 | 10/1987 | Hirakura et al. | 118/652 |
| 4,775,874 | 10/1988 | Büyükgüclüe | 118/636 |
| 4,786,936 | 11/1988 | Ikegawa et al. | 355/300 |
| 4,906,104 | 3/1990 | Nishise et al. | 366/319 |
| 4,912,512 | 3/1990 | Midorikawa et al. | 355/260 |
| 4,928,145 | 5/1990 | Okamoto et al. | 355/245 |
| 4,952,979 | 8/1990 | Koefferlein et al. | 355/251 |
| 4,982,689 | 1/1991 | Honda et al. | 118/656 |
| 5,189,476 | 2/1993 | Anno et al. | 355/259 |
| 5,245,392 | 9/1993 | Behe et al. | 355/259 |

FOREIGN PATENT DOCUMENTS

| | | | |
|---|---|---|---|
| 0053973 | 3/1985 | Japan | 355/259 |
| 0281179 | 11/1988 | Japan | 355/253 |

OTHER PUBLICATIONS

Suresh P. Makhijani, "Text Magnetic Brush Roll", Xerox Disclosure Journal, vol. 4, No. 3, May/Jun. 1979, p. 303.
R. E. Hewitt, "Etched Developer Roll", Xerox Disclosure Journal, vol. 4, No. 4, Jul./Aug. 1979, p. 447.

*Primary Examiner*—Thu Anh Dang
*Attorney, Agent, or Firm*—Tallam I. Nguti

[57] ABSTRACT

A roller assembly for use in an electrostatographic development apparatus to transport developer material through a development zone. The roller assembly includes end cap sections for mounting rotatably to a housing of the development apparatus, and a spincasted sleeve section interconnecting the end cap sections. The spincasted sleeve section includes an outer layer that has a series of non-radial undercuts formed thereinto for retaining developer material being transported. In order to achieve consistent precision at relatively lower costs, the sleeve section is produced by spincasting a desired quantity of filled thermoset material in a simple reusable silicone mold formed and held in a mud frame.

14 Claims, 9 Drawing Sheets

DEVELOPER ROLLER ASSEMBLY AND METHOD FOR MAKING SAME

BACKGROUND OF THE INVENTION

This invention relates generally to an electrostatographic reproduction machine, and more particularly concerns a developer roller assembly and method for making same.

Generally, the process of electrostatographic reproduction includes charging a photoconductive member to a substantially uniform potential so as to sensitize the surface thereof. A charged portion of the photoconductive surface is exposed to a light image of an original document being reproduced. This records an electrostatic latent image on the photoconductive member. After the electrostatic latent image is recorded on the photoconductive member, the latent image is developed with a development apparatus by bringing a dry or liquid developer material into contact therewith. Two component and single component developer materials are commonly used. A typical two-component dry developer material has magnetic carrier granules with toner particles adhering triobelectrically thereto. A single component dry developer material typically comprises toner particles only.

During development, charged toner, for example, charged dry toner in the form of particles, is attracted to the latent image, thus forming a toner image on the photoconductive member. The toner image is subsequently transferred to a copy sheet. Finally, the toner image is heated and permanently fused to the copy sheet, forming a "hardcopy" of the original image.

As disclosed for example in U.S. Pat. No. 4,267,797, one type of a two-component development apparatus includes a housing defining a chamber for holding two-component dry developer material that includes toner and magnetizable carrier particles or beads. The development apparatus also includes at least a rotatable magnetic roll for transporting a quantity of such developer material in the form of a magnetic brush, into and through a development zone of the apparatus for contacting a latent image to be developed.

As also disclosed for example in U.S. Pat. No. 5,245,392, and U.S. Ser. No. 07/091858 both assigned to the assignee of the present application, another type of a two-component development apparatus is a hybrid development system that includes a housing defining a mixing chamber storing dry developer material consisting of carrier beads and charged toner particles. The development apparatus includes a donor roll mounted within the housing for rotatably transporting charged toner particles from the mixing chamber to a development zone. A plurality of electrode wires are mounted closely spaced relative to the donor roll within the development zone. An AC voltage is applied to the electrode wires for forming a toner cloud in the development zone. Electrostatic fields generated by an adjacent latent image serve to attract charged toner particles from the toner cloud, thus developing the latent image. In addition, a conductive, usually metallic magnetic roll is also mounted within the housing for transporting developer material from the mixing chamber to the donor roll. The magnetic roll is mounted rotatably between the mixing chamber and the donor roll, and serves to magnetically attract and hold magnetizable carrier particles or beads (which have charged toner triboelectrically adhering thereto) onto its roughened or knurled surface. The charged toner is then electrostatically attracted from the carrier beads on the roughened or knurled surface of the magnetic roll onto the donor roll for transporting to the development zone.

The uniformity and quality of latent images developed in the development zone depend significantly on the quantity and uniformity of developer material repeatably transported by the magnetic roll to the development zone in a magnetic brush system, or to the donor roll in a hybrid development system. As disclosed for example in each of the following references, the quantity and uniformity of developer material transported by such a magnetic roll are determined primarily by the surface roughness of the magnetic roll. For example, in this regard U.S. Pat. No. 4,034,709 (issued Jul. 12, 1977 to Fraser et al.) discusses the importance of, and several ways of, roughening the surfaces of magnetic developer rolls. In particular, it discloses such a magnetic developer roll that includes a rough styrene-butadiene surface-coating for holding and directly transporting developer material through a development zone.

Xerox Disclosure Journal (Vol. 4, No. 3 May/June 1979) discloses a magnetic roll in which desired surface roughness is obtained by covering the roll with a netting material such as nylon stockings. Xerox Disclosure Journal (Vol. 4, No. 4 July/August 1979) on the other hand discloses a similar magnetic roll that is roughened by forming a multiplicity of small, shallow depressions in its surface. As a further example, U.S. Pat. No. 4,558,943 (issued Dec. 17, 1985 to Patz) discloses a similar magnetic roll that is roughened by forming valleys in its surface which are then filled with a polymeric material.

As can be expected, when such rolls are used to transport two-component developer material containing carrier beads which can be abrasive, the carrier beads tend to wear out the desired roughness of their surfaces over time. Such wearing out of the surface roughness of a roll disadvantageously and eventually reduces the frictional characteristics of the surface, and hence its ability to repeatably transport desired quantities of developer material. This particular disadvantage is further aggravated in development apparatus that are required to operate at substantially high rates of speed. In such an apparatus, the magnetic roll is accordingly required to rotate at a substantially high number of revolutions per unit time. As can be expected, at such high rates of rotation, centrifugal forces, for example, make it increasingly difficult for the rotating roll to hold onto and transport developer material on its worn out surface. There is therefore a need for an improved magnetic roll with a surface finish that exhibits acceptable developer material holding ability even at high speeds.

Additionally, in a conventional hybrid development system, formation of toner clouds in the development zone ordinarily is due only to the field effects of the biasing electrode wires. It is believed that such field effects can be augmented mechanically by the agitative effects of particular surface finishes of a donor roll as partially exposed in development zone. The result of such augmenting agitation should be more robust toner clouds and improved latent image development.

Conventionally, magnetic and donor rolls have been metallic in order to enable the knurling, for example, of a desired surface roughness thereon. Metallic rolls as such are ordinarily relatively more expensive than non-metallic rolls. Conventional attempts to provide such rolls with significant surface roughness features, for example, by molding, tend to be relatively expensive as well as difficult technically with respect to meeting required dimensions and tolerances. For example, conventional molds for such rolls are made from aluminum or steel, and must be finished and processed in various and expensive ways in order to achieve a desired internal diameter and finish for the desired roll surface roughness feature. The inside diameter and surface finish of the mold must be very accurate and highly polished in order to produce desired roll surface finish. This ordinarily is an inhibitor to the implementation and progress, for example, even of attempts to spincast such rolls in that, as material formulations for a roll change in order to meet various electrical or mechanical requirements as an example, the mold must also change to meet changes in the rate at which the material cures or shrinks. There is therefore a need for a relatively inexpensive and precise method of producing developer roll assemblies with significant surface roughness features for reliable developer material transportation, and augmented mechanical toner cloud formation within a development zone of a hybrid developer apparatus.

SUMMARY OF THE INVENTION

In accordance with the present invention, there is provided a roller assembly for transporting developer material in a development apparatus. The roller assembly includes a cylindrical sleeve section having a first inner layer providing rigidity to the sleeve section, and a second outer layer having a series of undercuts formed non-radially therein for holding developer material being transported. Each undercut of the series of undercuts includes a non-radial slot and a portion of the outer layer overhanging the non-radial slot.

In accordance with another aspect of the present invention, there is provided a method of forming a developer roller assembly having undercuts for transporting developer material in a development apparatus. The method includes the steps of machining a master of the roller assembly having a desired outer diameter and the desired undercuts on its peripheral surface; of staging the master concentrically within a generally cylindrical mold frame having an internal diameter greater than the outer diameter of the master; and of casting and curing silicone material around the staged master to form a silicone mold of the master within the mold frame, such that the formed silicone mold is secured to the mold frame. The method next includes axially removing the master from the formed and secured silicone mold to create a concentric mold cavity within the formed and secured silicone mold; adding a specified volume of a mixture of a thermoset plastic material, carbon powder and glass fillings to the concentric cavity within the formed and secured silicone; and rotating the mold frame using a drive means to spincast the material mixture into a multilayer roller assembly having the desired outer diameter and desired surface layer undercuts as in the master.

Other features of the present invention will become apparent from the following drawings and description.

BRIEF DESCRIPTION OF THE DRAWINGS

In the detailed description of the invention presented below, reference is made to the drawings, in which.

DETAILED DESCRIPTION OF THE INVENTION

While the present invention will be described in connection with a preferred embodiment thereof, it will be understood that it is not intended to limit the invention to that embodiment. On the contrary, it is intended to cover all alternatives, modifications, and equivalents as may be included within the spirit and scope of the invention as defined by the appended claims.

Figure 8:
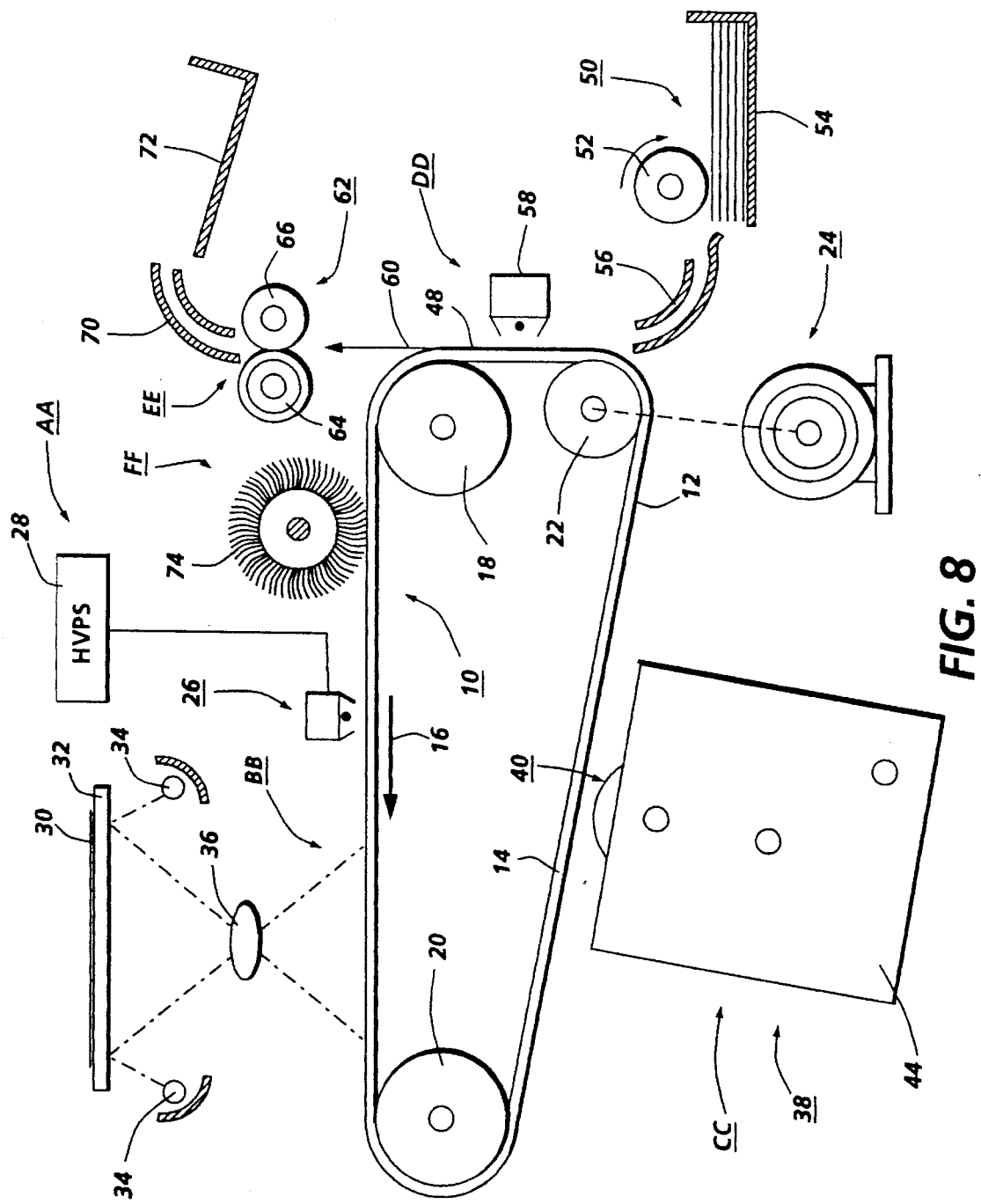
FIG. 8 is a schematic elevational view of an illustrative electrostatographic reproduction machine incorporating the development apparatus of the present invention.

Referring initially to FIG. 8, there is shown an illustrative electrostatographic reproduction machine 9 incorporating the development apparatus of the present invention therein. The electrostatographic reproduction machine 9 employs a belt 10 having a photoconductive surface 12 deposited on a conductive substrate 14. Preferably, photoconductive surface 12 is made from a selenium alloy. Conductive substrate 14 is made preferably from an aluminum alloy which is electrically grounded. Belt 10 moves in the direction of arrow 16 to advance successful portions of photoconductive surface 12 sequentially through various processing stations disposed along the path of movement of the surface 12. Belt 10 is entrained about stripping roller 18, tensioning roller 20 and drive roller 22. Drive roller 22 is mounted rotatably in engagement with belt 10. Motor 24 rotates roller 22 to advance belt 10 in the direction of arrow 16. Roller 22 is coupled to motor 24 by suitable means such as a drive belt. Belt 10 is maintained in tension by a pair of springs (not shown) resiliently urging tensioning roller 20 against belt 10 with the desired spring force. Stripping roller 18 and tensioning roller 20 are mounted to rotate freely.

Initially, a portion of belt 10 passes through charging station AA. At charging station AA, a corona generating device, indicated generally by the reference numeral 26, charges photoconductive surface 12 to a relatively high, substantially uniform potential. High voltage power supply 28 is coupled to corona generating device 26. Excitation of power supply 28 causes corona generating device 26 to charge photoconductive surface 12 of belt 10. After photoconductive surface 12 of belt 10 is charged, the charged portion thereof is advanced through exposure station BB.

At exposure station BB, an original image of document 30 is placed face down upon a transparent platen 32. Lamps 34 flash light rays onto original image of document 30. The light rays reflected from the original image are transmitted through lens 36 to form a light image thereof. Lens 36 focuses the light image of the original image onto a charged portion of photoconductive surface 12 to selectively dissipate the charge thereon. Such imagewise dissipation records an electrostatic latent image on photoconductive surface 12 that corresponds to the original image or informational areas (as opposed to background areas) contained within original document 30. One skilled in the art will appreciate that in lieu of a light lens system, a raster output scanner may be employed. The raster output scanner (ROS) uses a modulated laser light beam to selectively discharge the charged photoconductive surface 12 so as to record the latent image thereon. In the event a printing system is being employed, the modulation of the ROS is controlled by an electronic subsystem that is coupled to a computer. Alternatively, in the event a digital copier is being used, a raster input scanner may be used to scan the original image of document 30 in order to convert the original image into an electronic digital format which is then employed to control the ROS for forming a latent image of the original on the charged photoconductive surface.

After the latent image has been formed on photoconductive surface 12, belt 10 advances the latent image to development station CC. At development station CC, a developer unit of the present invention (to be described in detail below), indicated generally by the reference numeral 38, develops the latent image recorded on the photoconductive surface. Preferably, developer unit 38 includes the developer roller assembly of the present invention shown generally as 40 where the roller assembly 40 is used as a donor roll, the development apparatus 38 includes electrode wires 42. Electrode wires 42 are electrically biased relative to donor roll 40 to detach toner therefrom so as to form a toner cloud in the development zone gap between the donor roll and the photoconductive surface 12. The latent image on surface 12 attracts toner particles from the toner cloud, thus developing or forming a toner image thereon. A magnetic roller 46 disposed interiorly of the chamber 76 conveys the developer material to the donor roll 40A. The magnetic roller 46 is electrically biased relative to the donor roll 40A so that toner particles are attracted from the magnetic roller 46 to the donor roll 40A.

With continued reference to FIG. 8, after the electrostatic latent image is developed, belt 10 advances the toner powder image to transfer station DD. A copy sheet 48 is advanced to transfer station DD by sheet feeding apparatus 50. Preferably, sheet feeding apparatus 50 includes a feed roll 52 contacting the uppermost sheet of a stack 54 of such sheets. Feed roll 52 rotates to advance the uppermost sheet from stack 54 into chute 56. Chute 56 directs the advancing sheet into contact with photoconductive surface 12 of belt 10 in a timed sequence so that the toner image on the surface 12 contacts the advancing sheet at transfer station DD. Transfer station DD additionally includes a corona generating device 58 which sprays appropriate ions onto the backside of sheet 48 in order to cause the toner image to be attracted or to transfer from photoconductive surface 12 to sheet 48. After such image transfer, sheet 48 is separated from the surface 12, and continues to move in the direction of arrow 60 onto a conveyor (not shown) which advances sheet 48 to fusing station EE.

Fusing station EE includes a fuser assembly indicated generally by the reference numeral 62 which heats and permanently affixes the transferred toner image to sheet 48. Fuser assembly 62 includes a heated fuser roller 64 and back-up roller 66. Sheet 48 passes between fuser roller 64 and back-up roller 66 with the toner image contacting heated fuser roller 64. In this manner, the toner image is heated and permanently affixed to sheet 48. After fusing, sheet 48 advances through chute 70 to catch tray 72 for subsequent removal from the printing machine by the operator.

After the copy sheet is separated from photoconductive surface 12 of belt 10 following toner image transfer, residual toner particles remaining on the photoconductive surface 12, are removed at cleaning station FF. Cleaning station FF includes, for example, a rotatably mounted fibrous brush 74 in contact with photoconductive surface 12. The residual toner particles are cleaned from photoconductive surface 12 by the rotation of brush 74 in contact therewith. Subsequent to such cleaning, a discharge lamp (not shown) floods photoconductive surface 12 with light to dissipate any residual electrostatic charge remaining thereon, thus preparing the surface 12 for another charging and successive imaging cycle.

It is believed that the foregoing description is sufficient for purposes of the present application to illustrate the general operation of an electrophotographic printing machine incorporating the developer unit 38 of the present invention.

Figure 1A:
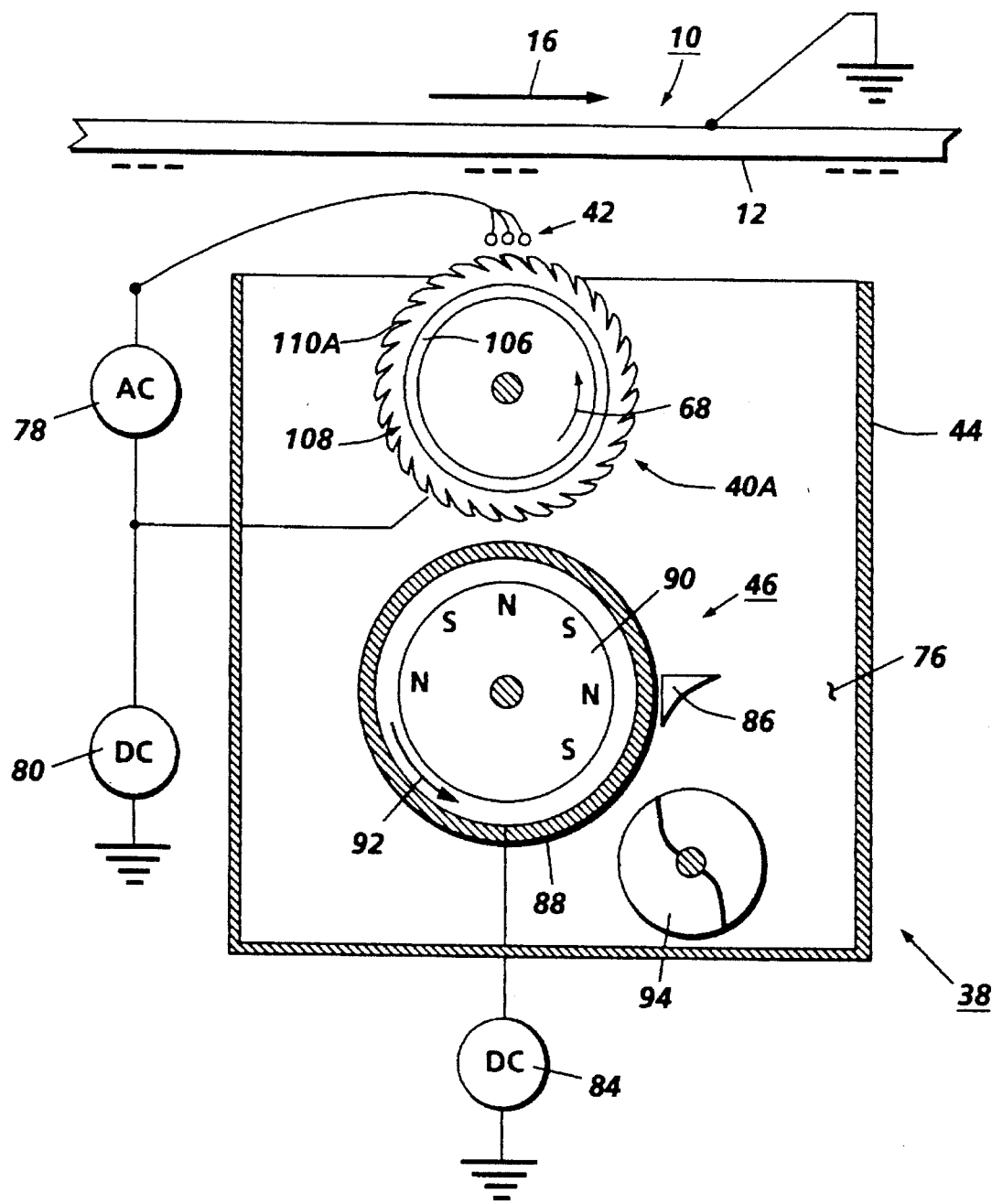
FIG. 1A is a schematic elevational view, showing a first donor roll embodiment of the development apparatus of the present invention.
Figure 1B:
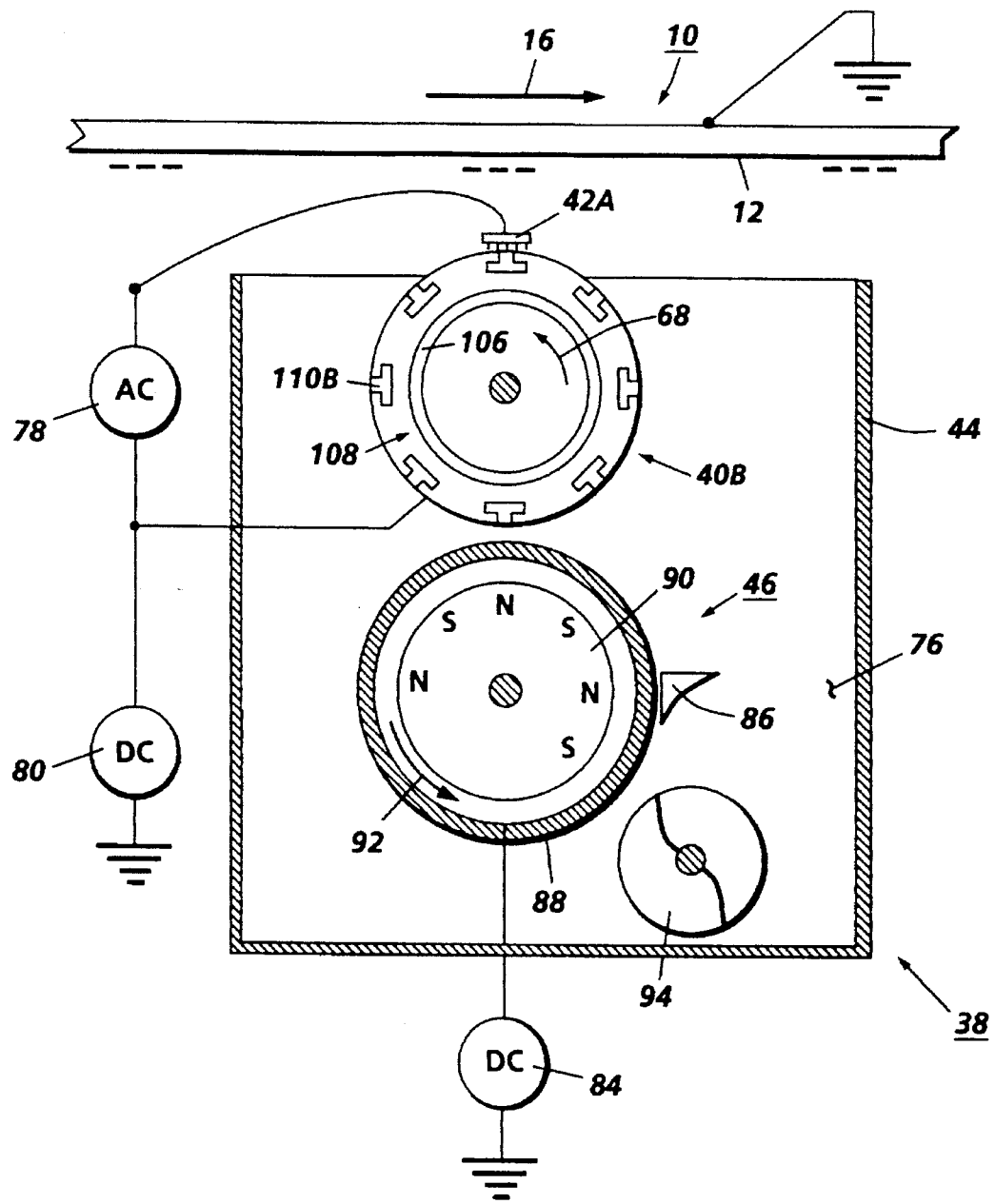
FIG. 1B is a schematic elevational view, showing a second donor roll embodiment of the development apparatus of the present invention.

Referring now to FIGS. 1A and 1B, there is each shown in greater detail, the developer unit 38 of the present invention. As shown, developer unit 38 includes a housing 44 defining a chamber 76 for storing a supply of developer material therein. In FIG. 1A, the developer roller assembly of the present invention is being used as a donor roll 40A mounted partially in the chamber 76 of housing 44. As shown, donor roll 40A is a non-electrode roll, and as such, the development apparatus 38 includes electrode wires 42 in the development zone for forming a toner cloud from toner particles on the surface of the donor roll 40A. The chamber 76 in developer housing 44 stores a supply of developer material, for example, two component developer material that has at least carrier granules with toner particles adhering triboelectrically thereto.

As also shown, donor roll 40A can be rotated in either the "with" or "against" direction, for example in the direction of the arrow 68 relative to the direction of motion of belt 10. Similarly, the magnetic roller 46 can also be rotated in either the "with" or "against" direction, for example in the direction of arrow 92, relative to the direction of motion of belt 10. Referring now to FIG. 1B, the developer roller assembly of the present invention is being used as an electroded donor roll 40B in which the electrodes (not shown) would embedded into the surface layer of the roll itself for commutative biasing by means 42A in the development zone. Otherwise, the development apparatus of FIG. 1B operates in the same manner as that of FIG. 1A.

As further illustrated in FIGS. 1A and 1B, an alternating electrical bias is applied to the electrode wires, or to the commutative means 42A by an AC voltage source 78. The applied AC voltage establishes an alternating electrostatic field in the development zone which is effective in detaching toner from the donor roll 40A, 40B and in forming a toner cloud within the development zone. A bias supply 80 cooperatively establishes an electrostatic field between photoconductive surface 12 of belt 10 and donor roll 40A, 40B for attracting the detached toner particles from the toner cloud in the development zone to the latent image recorded on the photoconductive surface 12. A cleaning device, for example, may be employed to strip toner from donor roll 40A, 40B after the development zone, so that magnetic rollers 46 can feed fresh toner to a substantially clean donor roll. Magnetic roller 46 meters a constant quantity of toner having a substantially constant charge onto donor roll 40A, 40B. This insures that the donor roll provides a constant amount of toner having a substantially constant charge for transfer to the development zone.

In lieu of a cleaning device, a combination of donor roll spacing (i.e. spacing between the donor roll 40A, 40B and the magnetic roller 46), with the magnetic properties of the magnetic roller, and the use of a conductive, magnetic developer material, can be used to achieve toner removal from donor roll 40A, 40B. A DC bias supply 84 additionally is employed to establish an electrostatic field between magnetic roller 46 and donor roll 40A, 40B, thus causing toner particles to be attracted from the magnetic roller to the donor roll. Metering blade 86 is positioned closely adjacent to magnetic roller 46 to maintain a compressed pile height of the developer material on magnetic roller 46 at the desired level. As further shown, an elongate, and stationary magnetic member 90 is preferably positioned interiorly of, and spaced from, the tubular member of magnetic roller 46. The tubular member rotates for example in the direction of arrow 92 in order to advance developer material adhering thereto from the sump portion of chamber 76 into the nip defined by donor roll 40A, 40B and magnetic roller 46. Toner particles are attracted thus from the carrier granules on the magnetic roller 46 to the donor roll.

With continued reference to FIGS. 1A, 1B, an auger, indicated generally by the reference numeral 94, is located in chamber 76 of housing 44. Auger 94 is mounted rotatably in chamber 76 to mix and transport developer material. The auger 94, for example, has blades extending spirally outwardly from a shaft. The blades are designed to advance the developer material in an axial direction substantially parallel to the longitudinal axis of the shaft.

Figure 1C:
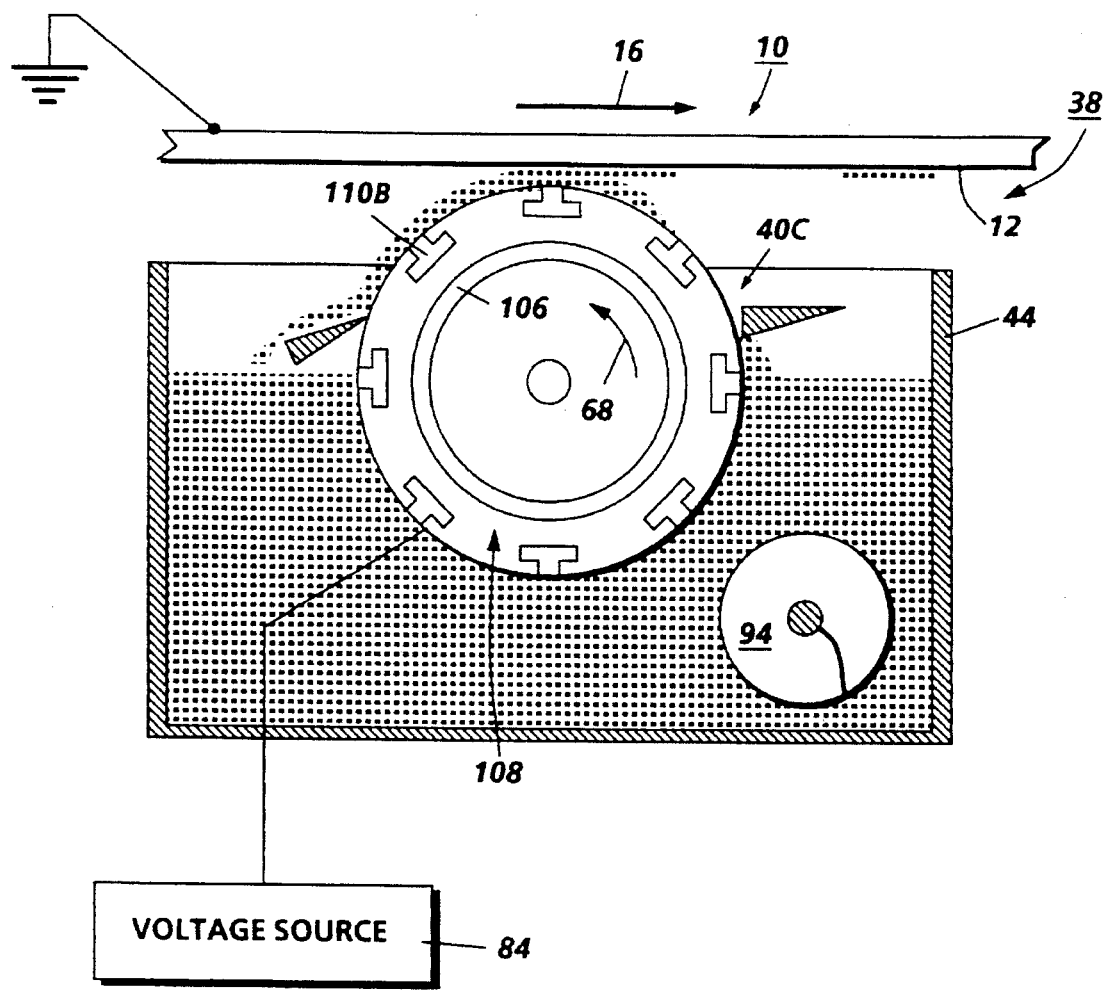
FIG. 1C is a schematic elevational view, showing a magnetic brush roll embodiment of the development apparatus of the present invention.
Figure 2A:
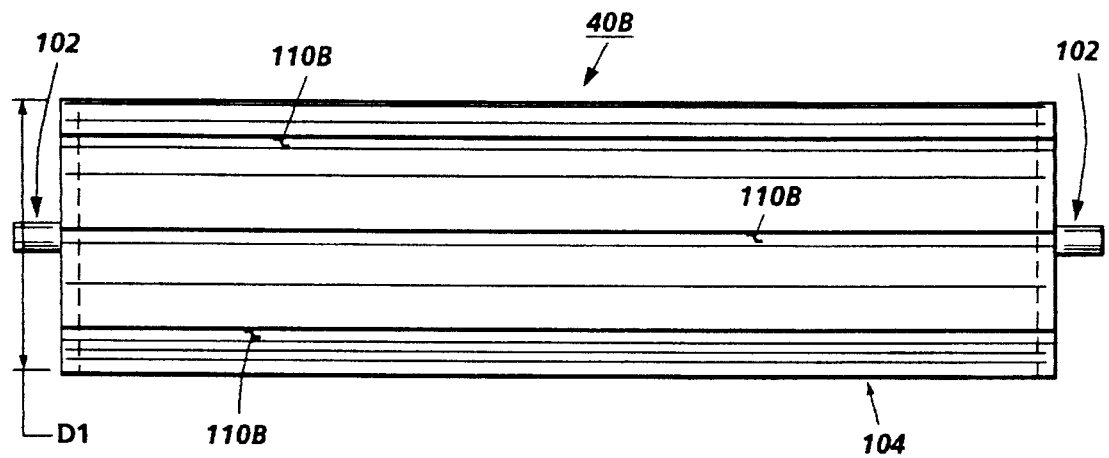
FIGS. 2A and 2B are schematic side and end views respectively of the developer roller assembly of the present invention as used in each of the FIGS. 1B and 1C development apparatus.
Figure 2B:
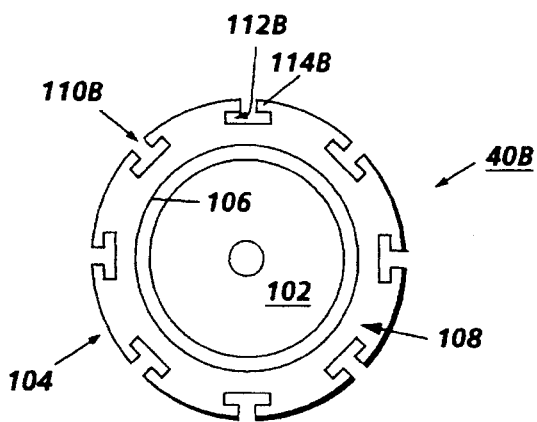
Figure 3A:
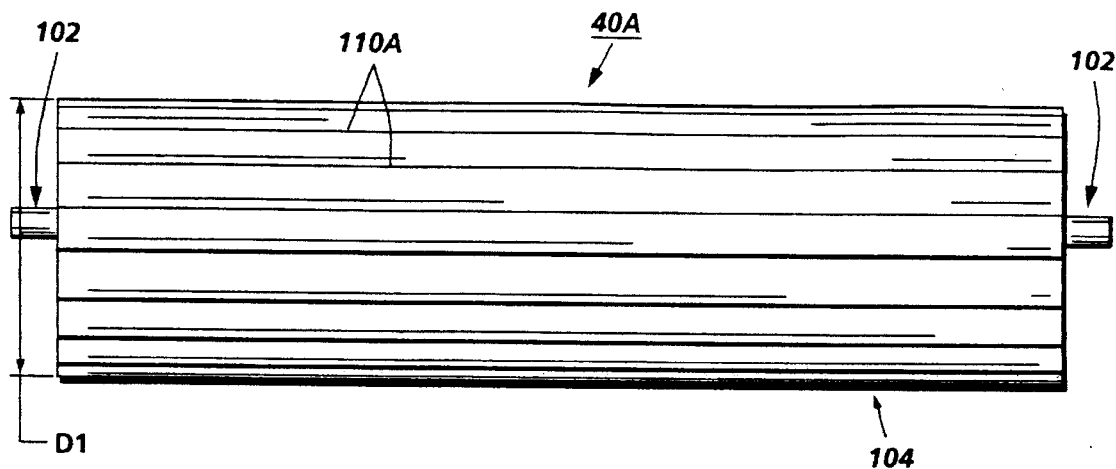
FIGS. 3A and 3B are schematic side and end views respectively of the developer roller assembly of the present invention as used in the FIG. 1A development apparatus.
Figure 3B:
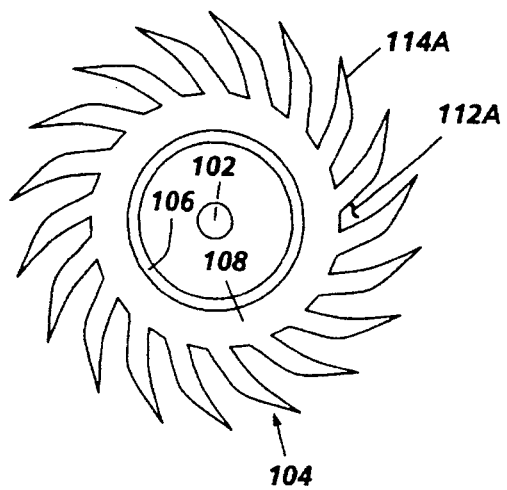

Referring now to FIG. 1C, there is shown another embodiment of the development apparatus 38 of the present invention. In this embodiment, like elements as in FIGS. 1A and 1B are shown with like reference numerals. Importantly, the development apparatus 38 of this embodiment also includes the improved elements that enable the repeatable delivery of a uniform, desired quantity of developer for high speed latent image development. In FIG. 1C, the developer roller assembly of the present invention is being used effectively as a magnetic brush development roll 40C, in a magnetic brush development apparatus housing 44. The magnetic brush developer roll 40C as shown receives developer material from the mixing chamber 76 and transports it directly into and through the development zone for image development. According to the present invention, the developer roll 40C which is used to transport two-component developer material containing abrasive carrier beads, is provided with an outer layer suitable for receiving and embedding surface transport magnetic strips (not shown) for enhancing developer material transportation. Additionally, in accordance with the present invention, the donor rolls 40A and 40B are designed to insure the constant and augmented creation of toner clouds in the development zone. Donor roll 40A achieves this through the effects of mechanical agitation of toner particles in the development zone, and donor roll 40B achieves it through the effect of clean uncontaminated embedded electrodes.

Referring now to FIGS. 2A to 3B, the embodiments of the developer roller assembly 40A, 40B, 40C of the present invention for transporting developer material in the development apparatus 38, are illustrated. As shown, the developer roller assembly 40A, 40B, 40C includes a first and a second end cap sections 102 assembled in any suitable manner for mounting each roller assembly rotatably to the housing 48, 48A of development apparatus 38. In each case, the roller assembly 40A, 40B, 40C includes a spincasted cylindrical sleeve section 104 that interconnects the first and second end cap sections 102. The sleeve section 104 includes a first inner layer 106 for providing rigidity to the sleeve section, and a second outer layer 108 having a variable surface profile which can be sinusiodal or radial, or as illustrated, in the form of a series of undercuts 110A, 110B formed non-radially into the outer layer for enabling retention of developer material being transported thereby. Each undercut 110A, 110B of the series of undercuts includes a non-radial slot 112A, 112B, and a portion 114A, 114B of the outer layer 108 overhanging the non-radial slot 112A, 112B.

The first inner layer 106 of the sleeve section 104 is comprised of a fiber-filled thermoset plastic material, for example, an epoxy resin or vinyl ester. The fiber fillings for example can be glass beads to give the sleeve section desired rigidity and a wear resistant interior. The second outer layer 108 thereof is comprised of the thermoset plastic material, that is, an epoxy resin or vinyl ester, which preferably is filled with carbon powder in order to make at least the outermost portion of the second layer 108 electrically conductive. Referring in particular to FIG. 1A, in the developer roller assembly 40A, the series of non-radially extending slots 112A, and overhanging layer portions 114A define a saw-toothed cross-section. The slots 112A according to the method of the present invention (to be described below) can be made as deep and as wide as desired for effective developer material or toner transport and projection (throwing) within the development zone of the development apparatus 38. Referring in particular to FIG. 1B, in the developer roller assembly 40B, the series of non-radially extending slots 112B and overhanging layer portions 114B each form an inverted-T. The roller assembly 40B can be finished by insertably assembling magnets or electrodes in the inverted-T slots. Electrodes enclosed within the slots will tend to remain substantially uncontaminated, and hence act effective in forming toner clouds. Such surface finish to the roller assembly 40A, 40B will clearly be difficult, if not impossible to produce by means of a conventional metallic, or radially removable-half mold.

Referring now to FIGS. 4 to 8, the method of forming the roller assembly 40A, 4013, 40C of the present invention, is illustrated. The method includes the step of forming a master 120 of the roller assembly such that the master has a desired outer diameter D1 and desired undercuts in its outer surface. It also includes steps for forming a silicone mold 136 within a mold frame 122, and steps for spincasting a desired material mixture in the silicone mold to form the roller assembly of the present invention.

Figure 4:
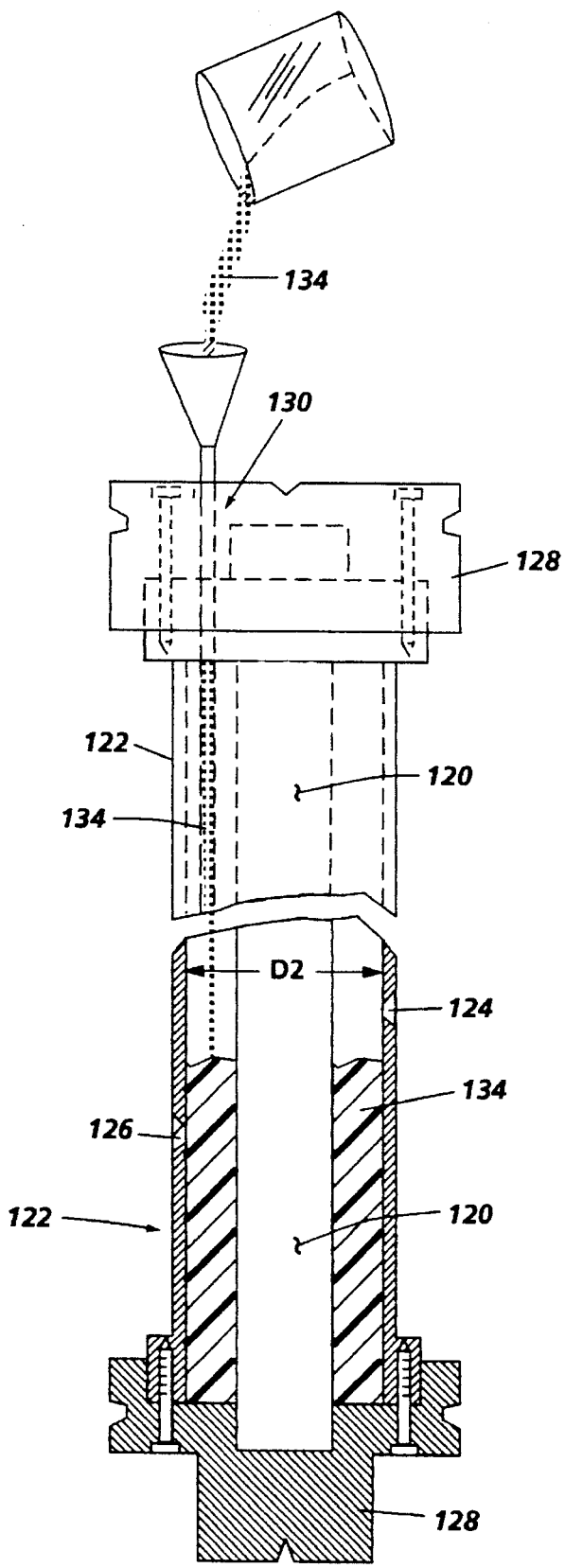
FIG. 4 is a schematic elevational view, partly in section, of the apparatus of making a mold assembly for the method of the present invention.
Figure 5:
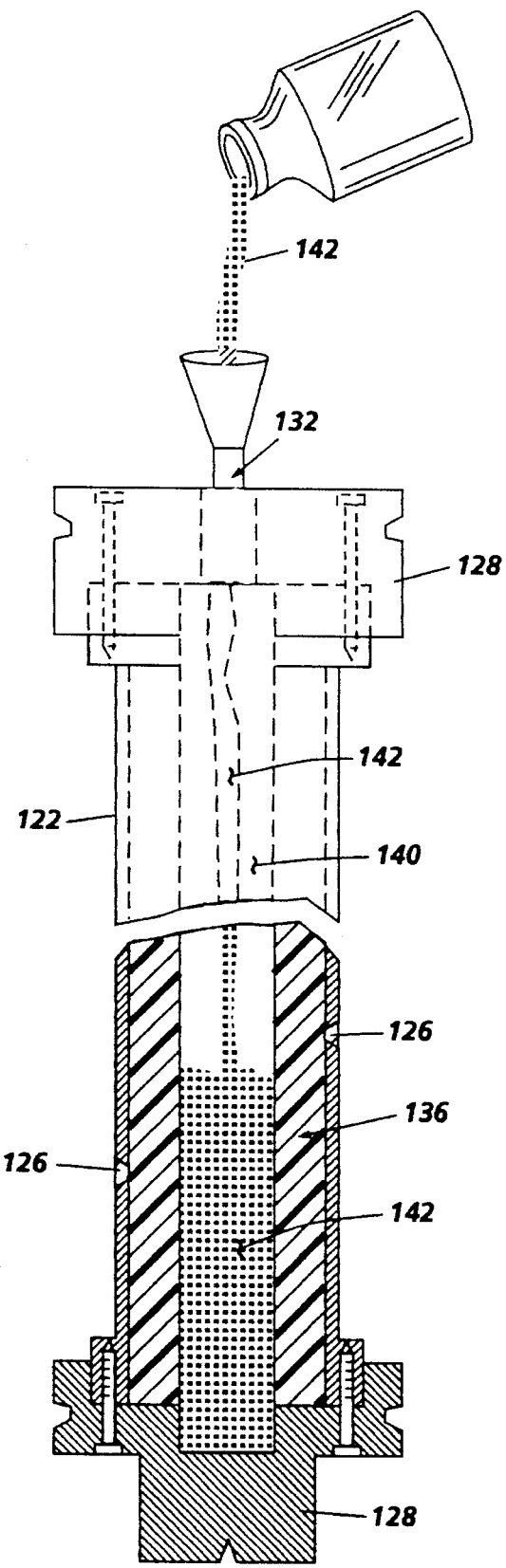
FIGS. 5, 6 and 7 are schematic side views, partly in section, of the steps of the method of making the developer roll assembly of the present invention.
Figure 6:
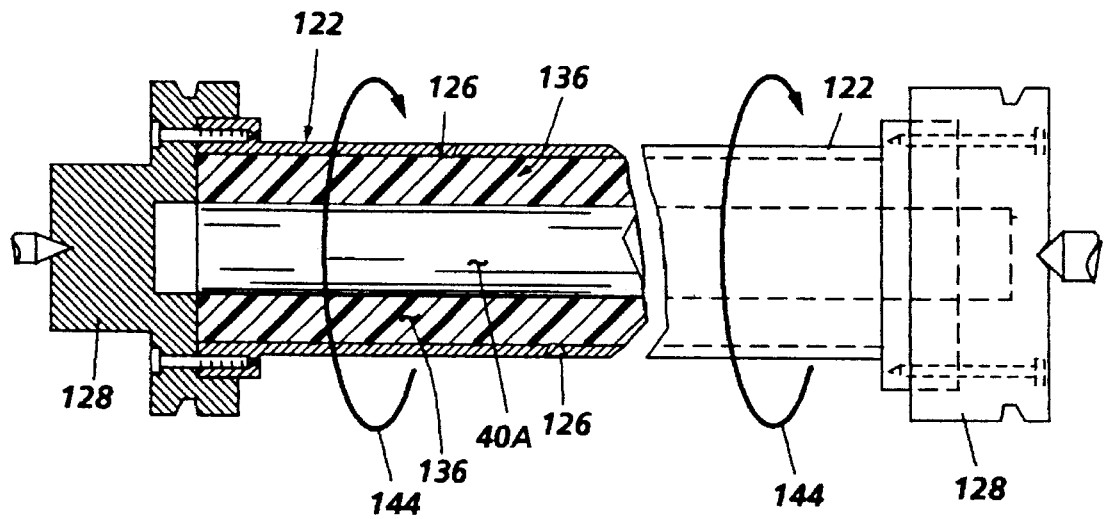
Figure 7:
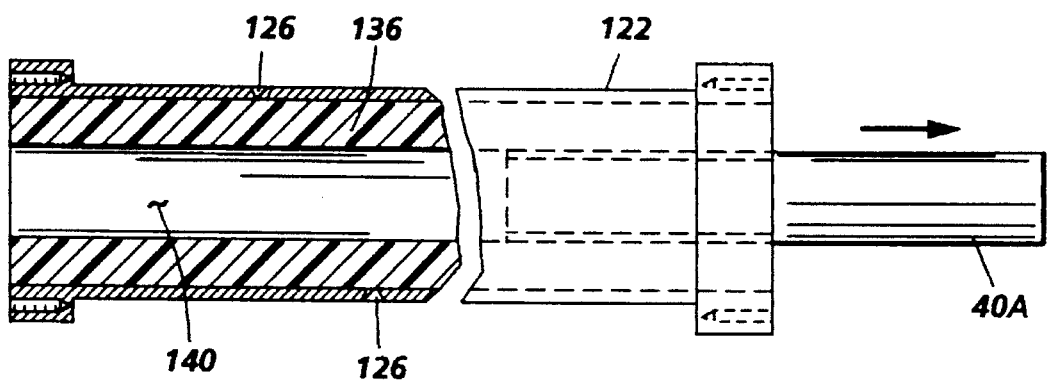

As illustrated in FIG. 4, a precisely formed master 120 of the roller assembly 40A, 40B, 40C which is made from any suitable material, is staged concentrically within a generally cylindrical mud or mold frame 122. The mud frame 122 has an internal diameter D2 that is greater than the outer diameter D1 of the master 120. The mud frame also includes a pattern of retaining features or means 124 within the cylindrical wall of the mud frame for securing a formed mold to the mud frame. The mud frame as such is designed to support and retain or secure a formed mold within it. The retaining features or means 124 preferably are flanged holes through the walls of the mud frame for allowing material used to form a mold, to flow through the wall thereby capturing and securing such formed mold. The mud frame 122 is reusable simply by cutting out portions of the mold material 126 captured within the flanged holes 124 and then axially forcing the mold out of the mud frame.

As shown, the mud frame 122 includes a removable end cap 128 at each end with provisions for staging the master 120, and means 130, 132 for adding molding material into the mud frame. The master 120 may be a solid component staged on shafts or journals, or it may be a hollow tube staged on its internal diameter.

According to the present invention, the method of forming the roller assembly 40A, 40B, 40C next includes the step of adding liquid silicone material 134 (FIG. 4) through means 130 around the master 120, as staged within the mud frame 122, to form a silicone mold 136 within the space between D1 of the master and D2 of the mud frame. The silicone mold 136 being ductile and forgiving precisely will duplicate the surface patterns of the master 120 including the desired variable surface profile which can be sinusiodal or radial, or as illustrated, in the form of a series of undercuts 110A, 110B. For making the mold 136, the spacing between D1 and D2 should be completely filled with liquid silicone and some of it 126 should be allowed to ooze out through and into the flange holes 124. The silicone is then allowed to cure. The end caps 128 of the mud frame 122 are removed, and the master 120 is axially removed from the center of the formed silicone mold thus creating a center mold cavity 140 therein.

The end caps 128 are then reassembled to the mud frame 122 and a specified volume of a preferred material mix 142 of a resin such as vinyl ester or epoxy, and of glass beads and carbon powder, is poured into the center cavity 140. The mud frame 122 is placed on a drive machine (not shown) and rotated as shown by the arrows 144 in order to spincast the material mix 142 into the multilayered roller assembly 40A, 40B, depending on the master used. During such rotation, the retaining means 126 function to prevent movement of the silicone mold 136 relative to the mold frame 120.

It is, therefore, apparent that there has been provided in accordance with the present invention, a developer roller assembly 40A, 40B, 40C that fully satisfies the advantages hereinbefore set forth. The roller assembly 40A, 40B, 40C provided is non-metallic and hence relatively inexpensive. The method of forming it requires relatively short lead times and little machining. Precision can be assured from roller to roller. The surface finish which includes a variable surface profile that can be sinusiodal or radial, or as illustrated, in the form of a series of undercuts, is such as to insure augmented toner cloud formation, as well as reliable uniform developer material transportation, even at substantially high rates of speed. While this invention has been described in conjunction with a specific embodiment thereof, it is evident that many alternatives, modifications, and variations will be apparent to those skilled in the art. Accordingly, it is intended to embrace all such alternatives, modifications and variations that fall within the spirit and broad scope of the appended claims.

What is claimed is:

1. A roller assembly for transporting developer material in a development apparatus, the roller assembly comprising a cylindrical sleeve section including:
   (a) a first inner layer providing rigidity to said sleeve section; and
   (b) a second outer layer having a series of undercuts formed non-radially therein for holding developer material being transported, each undercut of said series of undercuts including a non-radial inverted T-slot and a portion of said second outer layer overhanging said non-radial inverted T-slot.

2. The roller assembly of claim 1, wherein said first inner layer of said sleeve section is comprised of a fiber-filled thermoset plastic material.

3. The roller assembly of claim 1, wherein said second outer layer of said sleeve section is comprised of a thermoset plastic material.

4. The roller assembly of claim 1, wherein each overhang portion of said outer layer includes a pair of first and second curved surfaces adjoining adjacent non-radial slots.

5. The roller assembly of claim 2, wherein said fiber-filled thermoset plastic material is comprised of an epoxy resin filled with glass beads.

6. The roller assembly of claim 3, wherein said second outer layer of said sleeve section is comprised of an epoxy resin.

7. The roller assembly of claim 3, wherein said second outer layer of said sleeve section is comprised of vinyl ester.

8. A method of forming a developer roller assembly having undercuts for transporting developer material in a development apparatus, the method comprising the steps of:
   (a) machining a master of said roller assembly having a desired outer diameter and the undercuts on a peripheral surface thereof;
   (b) staging said master concentrically within a generally cylindrical mold frame having an internal diameter greater than the outer diameter of said master;
   (c) casting and curing silicone material around said staged master to form a silicone mold of said master within said mold frame, such that said formed silicone mold is secured to said mold frame;
   (d) axially removing said master from said formed and secured silicone mold to create a concentric mold cavity within said formed and secured silicone mold;
   (e) adding a specified volume of a mixture of a thermoset plastic material, carbon powder and glass fillings to said concentric cavity within said formed and secured silicone; and
   (f) rotating said mold frame using a drive means to spincast said material mixture into a multilayer roller assembly having said desired outer diameter and desired surface layer undercuts as in said master.

9. The method of claim 8 including the step of securing said formed silicone mold to the mold frame using means within a cylindrical wall of the mold frame.

10. The method of claim 8 including the step of axially removing said spincasted multilayered roller assembly from said concentric cavity of said mold frame secured silicone mold.

11. A development apparatus for developing latent images formed on a surface of a printing machine, the development apparatus comprising:
   (a) a housing having a development opening for positioning against the surface on which a latent image is to be developed, said housing defining a chamber storing a supply of developer material;
   (b) means within said chamber for moving and mixing said supply of developer material; and
   (c) a developer roller assembly mounted within said housing and partially through said development opening for transporting a quantity of said supply of developer material received from said moving and mixing means through a development zone adjacent the surface, said developer roller assembly including a spincast sleeve section having an outer layer and a pattern of undercuts formed non-radially into said outer layer for enabling transportation of developer material, each of said-undercuts including a non-radial slot within said outer layer and a portion of said outer layer overhanging said non-radial slot.

12. The development apparatus of claim 11, wherein said developer material comprises toner.

13. The development apparatus of claim 11, wherein said developer material comprises toner particles and magnetic carrier particles.

14. The development apparatus of claim 11 further including a developer material feeder roll, wherein said developer roller assembly comprises a donor roll for receiving toner particles from said developer material feeder roll.

* * * * *